ns Office 3,424,181
Patented Jan. 28, 1969

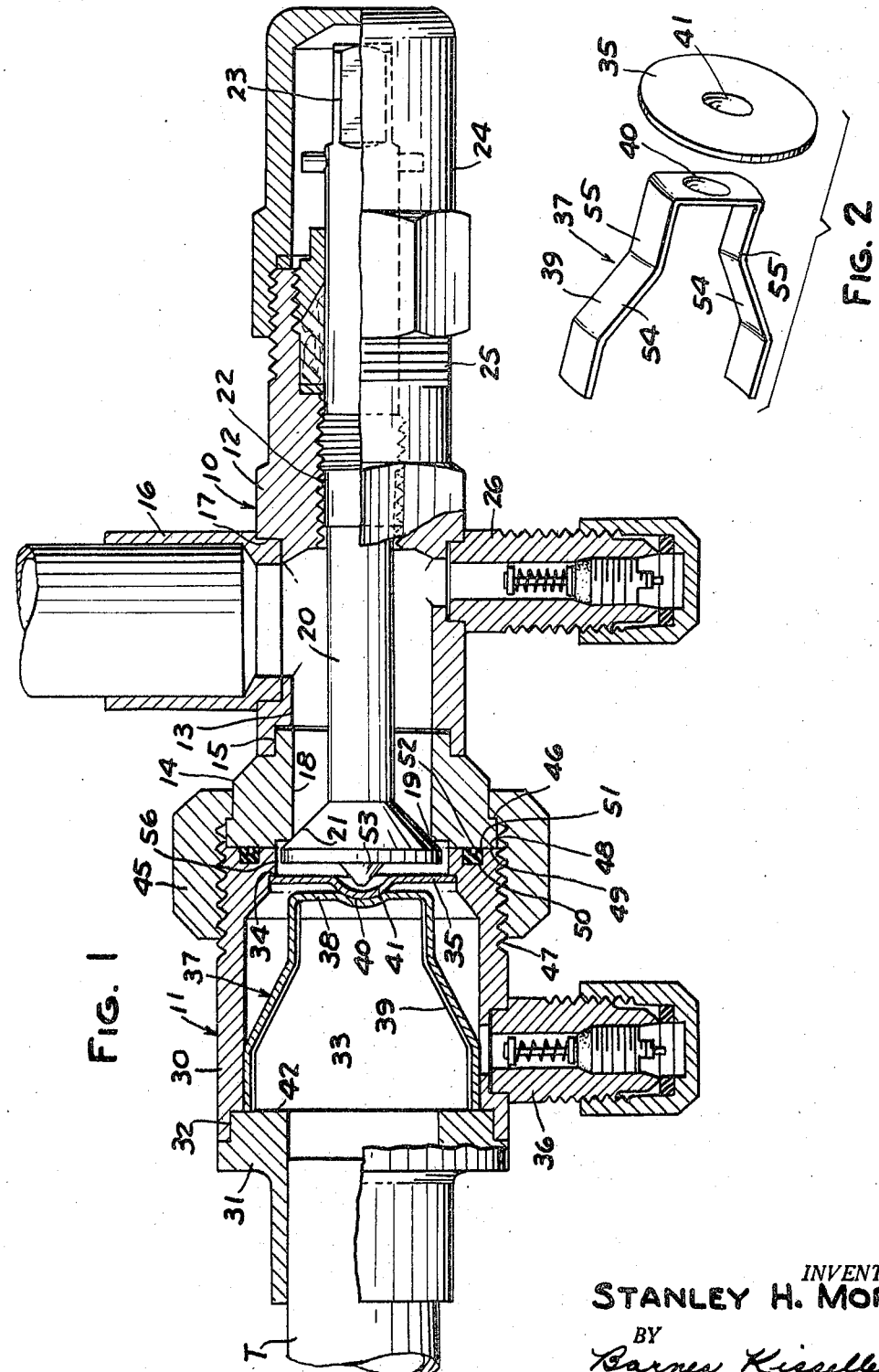

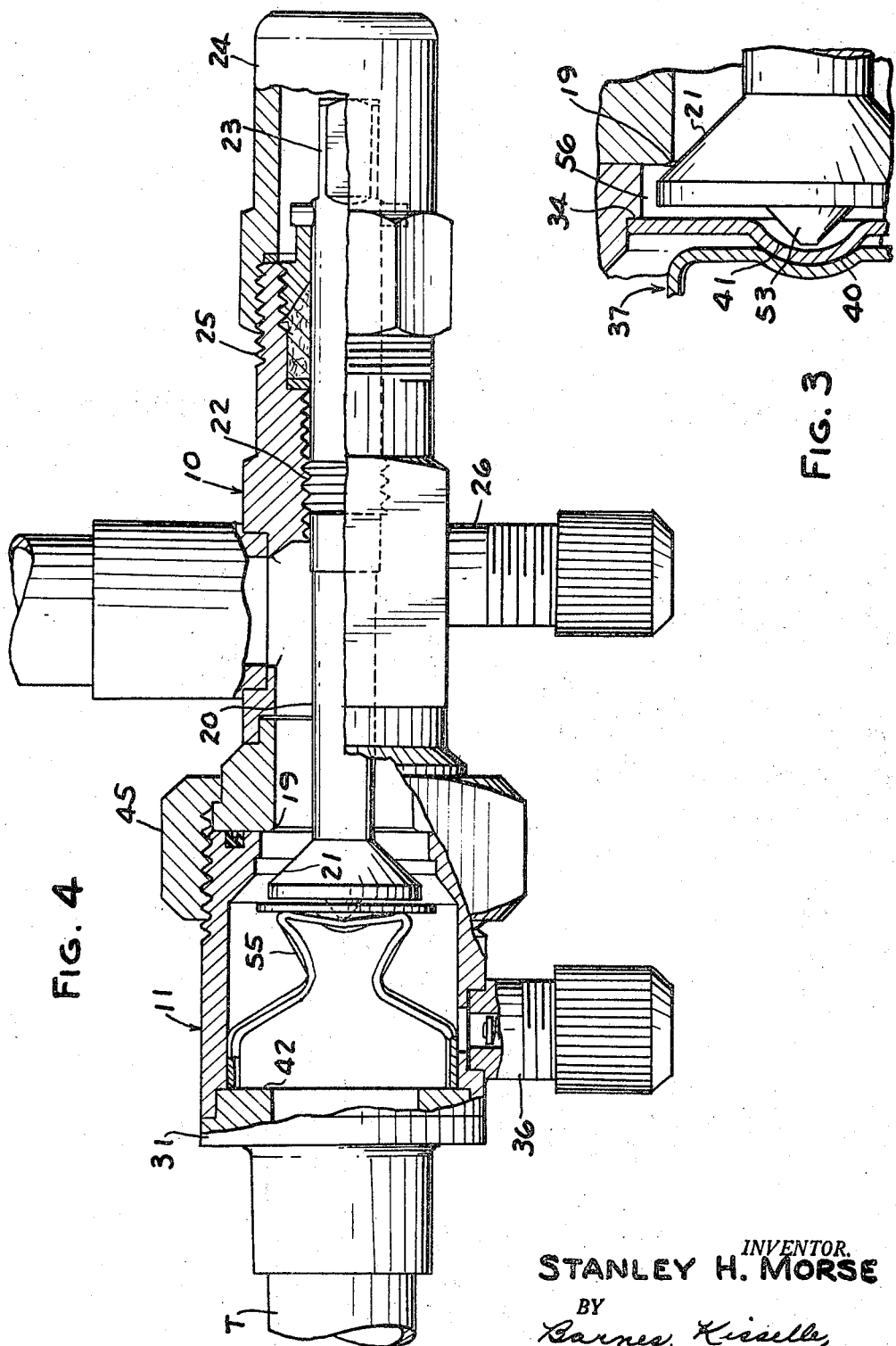

3,424,181
REFRIGERATION VALVE
Stanley H. Morse, Adrian, Mich., assignor to Primore Sales, Inc., Adrian, Mich., a corporation of Michigan
Filed Sept. 30, 1965, Ser. No. 491,752
U.S. Cl. 137—68    14 Claims
Int. Cl. F25b 45/00; F16k 27/00

ABSTRACT OF THE DISCLOSURE

The refrigeration valve disclosed herein comprises a first body having a hollow chamber and an opening in one end thereof providing communication to the chamber. The body has another opening spaced from the first opening providing communication to the chamber. A valve stem is mounted for movement in the valve body and has a sealing surface adapted to engage a complementary surface in the first mentioned opening upon axially outward movement of the stem. A second body is provided and has an interengaging gas tight coupling with the first body. The second body has a chamber therein and an opening extending from the chamber adjacent the first mentioned opening of the first body. A sealing disc is brazed in the opening of the second body such that movement of the valve stem away from the sealing surface causes the valve stem to engage the disc and place the brazed connection under tension to sever the brazed connection.

---

This invention relates to refrigeration valves and particularly to shut off valves that are utilized between a refrigeration unit such as a compressor and a conduit extending to other components of the refrigeration system.

It is an object of this invention to provide a refrigeration valve of the shut off type wherein the seal to a precharged refrigeration unit may be readily broken; wherein the coupling to the refrigeration unit may be tested for leakage before breaking the seal to the refrigeration unit; wherein lack of contamination of the refrigeration system is insured; which can be manufactured at low cost; wherein the shut off valve can be readily manipulated to cut off communication between the refrigeration unit and the remaining part of the system which is under relatively high pressure thereby permitting certain repairs to be made to the system by isolating the effected area, and only losing a portion of the over all charge while making necessary replacement of defective parts; and wherein the valve can be mounted on the condensing unit permitting the manufacturer to operate the unit and test same prior to shipment to the field by coupling a jumper tube between the suction valve and liquid valve.

In the drawings:

FIG. 1 is a part sectional view through a refrigeration valve system embodying the invention.

FIG. 2 is an exploded perspective view of a sealing disc and disc retainer utilized in the refrigeration valve.

FIG. 3 is a part sectional view similar to FIG. 1 of a portion of the valve on an enlarged scale.

FIG. 4 is a view similar to FIG. 1 showing the relative positions of the parts when the seal to the refrigeration unit has been broken.

Referring to FIG. 1 the refrigeration valve embodying the invention comprises a first valve body 10 which is coupled to a second body 11 in a manner presently described, the body 10 being adapted to be mounted on or connected to a refrigeration unit.

Body 10 is elongated and comprises a first section 12 that is formed with a chamber 13 and a flared connector 14 that is brazed to the section 12 along a stepped shoulder 15. A tube adapter 16 is brazed to one side of the section 12 along a stepped shoulder 17 and provides communication to the chamber 13. The flared connector 14 includes an opening 18 that communicates with the chamber 13 and has a seating surface 19 at one end thereof where the opening extends to the exterior. A valve stem 20 having a conical sealing surface 21 is threaded into threads 22 in the section 12 and has a non-circular end 23 which can be grasped and rotated by a wrench to move the stem 20 axially of the body 10. A cap 24 is threaded onto threads 25 on the exterior of the body 10. A Schraeder valve fitting 26 is provided on the section 12 to permit charging of the system throughout the chamber 13.

The second body 11 includes a tubular section 30 and a tube adapter 31 that is brazed to the section 30 along a stepped joint 32. The body 11 thus has a chamber 33, the end of which opens adjacent the flared end 21 of the valve stem. The body is formed with a stepped shoulder 34 adjacent the opening and a disc 35 is brazed at point of contact with the surface of the shoulder 34. A second Schraeder fitting 36 provides communication to the chamber 33 for charging the other part of the refrigeration unit.

In order to hold the disc 35 in position during brazing, a disc retainer 37 is provided within the chamber and includes a bight portion 38 and legs 39. The bight portion 38 has a curved spherical section 40 that engages a spherical depression or dimple 41 in the disc 35 to insure proper alignment of the disc with respect to shoulder 34. The free ends of the legs 39 engage the flat surface 42 of the flared connector 31; and contact the side walls of chamber 33 for a short distance for brazing to same.

In assembly, the peripheral edge only of disc 35 is coated with a brazing paste, such as copper powder in alcohol, the brazing paste is also applied to the interengaging surfaces of the joints 40, and 32. The disc 35 is placed in position with its periphery engaging the shoulder 34 and the disc retainer is inserted with the spherical portion 40 engaging the projection 41. The flared connector 31 with copper paste applied is then inserted in the end of section 30. The entire assembly is then passed through the proper heating cycle to complete the brazed joints.

During the brazing, the disc retainer 37 holds the disc 35 in position. The resultant assembly is such that the disc is retained within the body 30 by a brazed joint or connection that can be readily severed by the valve stem 20 by moving the valve stem 20 axially and placing the brazed connection under tension. During this movement no part of the metal disc 35 is sheared or severed and as a result no metal fragments are produced which might enter the refrigeration system and contaminate it.

In use, the body 10 is mounted on or connected to a refrigeration unit and the unit may be charged with refrigerant throughout the Schraeder fitting 26. At the site of the refrigeration system, the precharged tubing T which is connected to adapter 31 is brought into position and the body 11 is coupled to the body 10. This is achieved by a threaded coupling nut 45 which engages a shoulder 46 on the body 10 and is threaded onto threads 47 on the body 11 to draw bodies 10 and 11 together. Bodies 10 and 11 include flat interengaging surfaces 48 and 49 that are brought into abutment. In addition an annular groove 50 is provided in the surface 49 and an annular Teflon fiber gasket 51 is placed in the groove 50. A radial rib 52 on the surface 48 projects into and compresses the gasket 51 to provide a gas tight seal.

When it is desired to connect the refrigeration unit with the remainder of the system the valve stem 20 is rotated approximately one-half turn. As shown in FIG. 3 there is a clearance between the end of the valve stem 20 and the disc 35 so that the sealing surface 21 moves away from the seat 19 permitting refrigerant to flow into chamber 56. In this manner the effectiveness of the seal between the surfaces 48 and 49 can be tested for leaks before the disc 35 is moved to sever the brazed connection between disc 35 and body 11.

If the seal is found satisfactory, then the valve stem 20 is rotated further to cause the conical projection 53 on the end of the valve stem to engage the spherical projection 41 on the disc 35 thereby holding disc centered with stem 20, while the flat portion of surface 21 engages disc 35. This places the brazed connection along the surface 34 under tension so that further axial movement of the valve 20 severs the brazed connection.

In order to permit the disc retainer 37 to readily yield during this movement, the legs 39 have intermediate portions 54 thereof extending inwardly so that the legs bend at the area of juncture of the intermediate portions with the portion 55 which connect the leg to the bight portion 38. Thus as the valve stem moves axially the legs are flexed inwardly in the manner shown in the FIG. 4

I claim:

1. In a refrigeration valve, the combination comprising a first body, said body having a hollow chamber therein, said body having an opening in one end thereof providing communication to said chamber, said body having another opening therein spaced from said first opening providing communication to said chamber, a valve stem, means mounting said stem in said body, said stem having a sealing surface adapted to engage a complementary surface in said first mentioned opening upon axially outward movement of said stem to arrest flow through said first mentioned opening, a second body, means providing an interengaging gas tight coupling between said first body and said second body, said second body having a chamber therein, said second body having an opening extending from said chamber and positioned adjacent the first mentioned opening of said first body, a sealing disc, said second body having a shoulder surrounding said opening therein at the end thereof adjacent said coupling means which is engaged by said sealing disc, and a brazing connection holding said sealing disc against said shoulder to arrest flow through said opening in said second body such that movement of said valve stem axially to move its sealing surface away from said sealing surface causes said valve stem to engage said disc and place said brazing connection under tension and continued movement of said valve stem causes said disc to move and sever said brazing connection.

2. The combination set forth in claim 1 including a disc retainer within said chamber of said second body, said retainer extending between said disc and abutment means in said chamber whereby the disc retainer holds said disc in position during brazing; and after the disc is moved to open position.

3. The combination set forth in claim 2 wherein said disc retainer includes yielding portions that are flexed upon said movement of said disc by said valve stem to sever said brazing connection.

4. The combination set forth in claim 3 wherein said disc and said disc retainer include spherical contacting portions.

5. The combination set forth in claim 3 wherein said disc retainer comprises a bight portion which engages said disc and by leg portions extending from said disc to said abutment means.

6. The combination set forth in claim 1 wherein a clearance is provided between the end of said valve stem and said disc such that the sealing surface of the valve stem may be moved away from said sealing surface to permit refrigerant to flow and thereby check the sealing efficiency of said gas tight coupling before said brazing connection is severed.

7. A combination set forth in claim 1 wherein said gas tight coupling includes flat abutting interengaging surfaces between said bodies, an annular groove in one of said surfaces, an annular sealing gasket in said groove, and annular rib on said surface of the other of said bodies extending into and compressing said annular gasket.

8. In a refrigeration valve, the combination comprising a first body, said body having a hollow chamber therein, said body having an opening in one end thereof providing communication to said chamber, said body having another opening therein spaced from said first opening providing communication to said chamber, a valve stem, means mounting said stem in said body, said stem having a sealing surface adapted to engage a complementary surface in said first mentioned opening upon axially outward movement of said stem to arrest flow through said first mentioned opening, a second body, means providing an interengaging gas tight coupling between said first body and said second body, said second body having a chamber therein, said second body having an opening extending from said chamber and adapted to be positioned adjacent the first mentioned opening of said first body, a sealing disc, said second body having a shoulder surrounding said opening therein at the end thereof adjacent said coupling means which is engaged by said sealing disc, and a brazing connection holding said sealing disc against said shoulder to arrest flow through said opening in said second body such that movement of said valve stem axially to move its sealing surface away from said sealing surface causes said valve stem to engage said disc and place said brazing connection under tension and continued movement of said valve stem causes said disc to move and sever said brazed connection, a disc retainer within said chamber of said second body, said retainer extending between said disc and abutment means in said chamber whereby the disc retainer holds said disc in position during brazing, said disc retainer including yielding portions that are flexed upon said movement of said disc by said valve stem to sever said brazing connection.

9. The combination set forth in claim 8 wherein a clearance is provided between the end of said valve stem and said disc such that the valve stem may be moved away fro msaid sealing surface to permit refrigerant to flow and thereby check the sealing efficiency of said gas tight coupling before said brazing connection is severed.

10. A combination set forth in claim 8 wherein said coupling includes flat abutting interengaging radial surfaces between said bodies, an annular groove in the surface of said second body, an annular sealing gasket in said groove, and annular rib on the surface of the first body extending into and compressing said annular gasket.

11. In a refrigeration valve, the combination comprising a first body, said body having a hollow chamber therein, said body having an opening in one end thereof providing communication to said chamber, said body having another opening therein spaced from said first opening providing communication to said chamber, a valve stem, means mounting said stem in said body, said stem having a sealing surface adapted to engage a complementary surface in said first mentioned opening upon axially outward movement of said stem to arrest flow through said first mentioned opening, a second body, means providing an interengaging gas tight coupling between said first body and said second body, said second body having a chamber therein, said second body having an opening extending from said chamber and adapted to be positioned adjacent the first mentioned opening of said first body, a sealing disc, said second body having a shoulder surrounding said opening therein at the end thereof adjacent said coupling means which is engaged by said sealing disc, and a brazing connection between the periphery of said sealing disc only and an axially extending surface holding said sealing disc against said shoulder to arrest flow through said opening in said second body such that movement of said valve stem axially to move its sealing surface away from said sealing surface causes said valve stem to engage said disc and place said brazing connection under tension and continued movement of said valve stem causes said disc to move and sever said brazing connection.

12. The combination set forth in claim 11 including a disc retainer within said chamber of said second body, said retainer extending between said disc and abutment means in said chamber whereby the disc retainer holds said disc in position during brazing; and after the disc is moved to open position.

13. The combination set forth in claim 12 wherein said disc retainer includes yielding portions that are flexed upon said movement of said disc by said valve stem to sever said brazing connection.

14. The combination set forth in claim 11 wherein a clearance is provided between the end of said valve stem and said disc such that the valve stem may be moved away from said sealing surface to permit refrigerant to flow and thereby check the sealing efficiency of said coupling.

References Cited
UNITED STATES PATENTS

| | | | |
|---|---|---|---|
| 1,414,665 | 5/1922 | Parsons | 137—316 XR |
| 1,937,982 | 12/1933 | Rudolph | 137—535 XR |
| 2,203,922 | 6/1940 | Paisley | 137—614.06 |
| 3,331,377 | 7/1967 | Castello | 137—68 |
| 3,091,945 | 6/1963 | Morse | 285—331 X |

ALAN COHAN, *Primary Examiner.*

RICHARD GERARD, *Assistant Examiner.*

U.S. Cl. X.R.

29—413, 423; 62—292; 137—316, 614.06, 614.11, 630.22